(12) United States Patent
Chabloz

(10) Patent No.: US 12,140,607 B2
(45) Date of Patent: Nov. 12, 2024

(54) SAFE MEASUREMENT OF TIRE CHARACTERISTICS

(71) Applicant: Melexis Technologies SA, Bevaix (CH)

(72) Inventor: Jeremie Chabloz, Bevaix (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 325 days.

(21) Appl. No.: 17/669,861

(22) Filed: Feb. 11, 2022

(65) Prior Publication Data

US 2022/0260610 A1    Aug. 18, 2022

(30) Foreign Application Priority Data

Feb. 17, 2021   (EP) .................... 21157609

(51) Int. Cl.
*G06F 11/30* (2006.01)
*B60C 19/00* (2006.01)
*G01P 1/02* (2006.01)
*G01P 15/08* (2006.01)
*G01P 21/00* (2006.01)

(52) U.S. Cl.
CPC .............. *G01P 21/00* (2013.01); *B60C 19/00* (2013.01); *G01P 1/023* (2013.01); *G01P 15/0802* (2013.01); *B60C 2019/004* (2013.01)

(58) Field of Classification Search
CPC ....................................................... G01P 21/00
See application file for complete search history.

(56) References Cited

U.S. PATENT DOCUMENTS

| 11,067,431 B2 | 7/2021 | Cyllik et al. |
| 2018/0180463 A1 | 6/2018 | Cyllik et al. |

FOREIGN PATENT DOCUMENTS

| DE | 102015216210 A1 | | 3/2017 |
| EP | 3480602 | * | 5/2019 |
| EP | 3480602 A1 | | 5/2019 |
| FR | 2985014 A1 | | 6/2013 |

OTHER PUBLICATIONS

Extended Search Report from corresponding EP Application No. 21157609.5, Jun. 15, 2021.

* cited by examiner

*Primary Examiner* — Phuong Huynh
(74) *Attorney, Agent, or Firm* — Workman Nydegger

(57) ABSTRACT

A method or system configured for assessing the integrity of a sensor module mounted in a tire of a wheel or on an inner surface of the tire of the wheel.

14 Claims, 8 Drawing Sheets

SAFE MEASUREMENT OF TIRE CHARACTERISTICS

FIELD OF THE INVENTION

The invention relates to the field of sensor devices mounted in a tire of a vehicle. More specifically it relates to systems and methods for safe measurements of tire characteristics.

BACKGROUND OF THE INVENTION

Tire pressure monitoring sensor (TPMS) are widely deployed to determine the pressure in a tire. Based on a signal from the TPMS, the driver can be informed that the tire is losing pressure. The driver can, based thereon, check the tire for leaks and inflate the concerned tire.

Such tire pressure monitoring sensors may be mounted in the wheel, attached to the tire, and may comprise acceleration sensors. It is expected that key features obtained from signals coming from the acceleration sensors could be exploited in the future in order to provide data that could be used to extract safety-relevant information, such as for example the load exerted on the wheel or the tire treads wear level.

In certain scenarios, such information could be used to adjust the behavior of various vehicle control algorithms, such as the electronic stability program (ESP). Within this context, the acquisition, processing and transmission of said information is associated with a significant (automotive) safety integrity level (ASIL), as defined for example in standards such as ISO26262.

The scope of the present invention is to propose ways to assess the integrity of a tire mountable acceleration sensor and of the signals measures by said acceleration sensor, when it is mounted in a tire.

SUMMARY OF THE INVENTION

It is an object of embodiments of the present invention to provide a system and a method for assessing the integrity of a tire mountable sensor module.

The above objective is accomplished by a method and device according to the present invention.

In a first aspect embodiments of the present invention relate to a sensor system configured for assessing the integrity of a sensor module mounted in a tire of a wheel or on an inner surface of the tire of the wheel.

The system comprises a sensor module configured for measuring a first acceleration in a first direction resulting in a first acceleration signal and/or for measuring a second acceleration in a second direction, different from the first direction, resulting in a second acceleration signal.

The sensor module is, moreover, configured for:
  determining at least two features of the first acceleration signal and/or
  determining at least one feature of the first acceleration signal and at least one feature of the second acceleration signal,
  wherein the features are characterizing a perturbation in the acceleration signal caused when a part of the tire, where the sensor module is mounted, hits the ground and forms a contact patch, wherein one of the features is a first feature and another feature is a second feature,
The sensor module is, moreover, configured for verifying the consistency of the first feature and the second feature by assessing if these features or a combination thereof meet a predefined operation characteristic.

The predefined operation characteristic may comprise an upper limit and/or a lower limit for one or more of the features or a combination thereof. This may for example be the upper limit and/or the lower limit of the second feature in function of the first feature. The invention is, however, not limited thereto.

It is an advantage of embodiments of the present invention than even with only one sensor it is possible to verify correct operation of the sensor. This is achieved by determining at least two features of the first acceleration signal (e.g. if only the first acceleration signal is measured), or by determining a feature of the first acceleration signal and a feature of the second acceleration signal (if both acceleration signals are measured), and by verifying the consistency of the first feature and the second feature by assessing if these features or a combination thereof meet at least one predefined operation characteristic. The at least two features which are determined are features which, under normal operating conditions of the sensor, are consistent. Their consistency can be checked by the proposed assessment. Normal operating conditions thereby refer to operating conditions when the sensor is not defect and operating when mounted against a tire of a wheel.

In embodiments of the present invention the sensor module comprises an accelerometer. This accelerometer may be a microelectromechanical system (MEMS) accelerometer. The MEMS accelerometer may comprise two distinct proof masses. These may be integrated in a same substrate. They may be integrated such that each of the accelerometers is measuring a different acceleration component.

In a second aspect embodiments of the present invention relate to a method for determining correct operation of an acceleration sensor when mounted in a tire of a wheel of on an inner surface of a tire of the wheel. The method comprises:
  measuring a first acceleration in a first direction resulting in a first acceleration signal and/or measuring a second acceleration in a second direction, different from the first direction, resulting in a second acceleration signal;
  receiving the first acceleration signal and/or the second acceleration signal,
  determining at least two features of the first acceleration signal and/or determining at least one feature of the first acceleration signal and at least one feature of the second acceleration signal, wherein the features are characterizing a perturbation in the acceleration signal caused when a part of the tire, where the sensor is mounted, hits the ground and forms a contact patch, wherein one of the features is a first feature and another feature is a second feature;
  verifying consistency of the first feature and the second feature by assessing if these features or a combination thereof meet at least one predefined operation characteristic.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
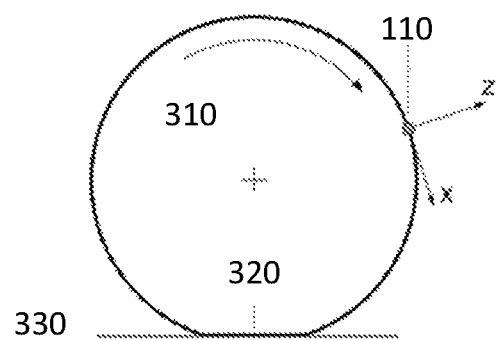
FIG. 1 shows a schematic drawing of a tire wherein a sensor module is mounted.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a sensor system 100 configured for assessing the integrity of a sensor module mounted in a tire of a wheel or on an inner surface of the tire of the wheel.

The system 100 comprises a sensor module 110 configured for measuring a first acceleration in a first direction resulting in a first acceleration signal and/or for measuring a second acceleration in a second direction, different from the first direction, resulting in a second acceleration signal.

In embodiments of the present invention the sensor module is mounted in a tire or on an inner surface of the tire of the wheel. The sensor can for example be completely integrated in the tire (over-molded), or partially over molded, or attached/glued on the inner surface, or affixed to the inside of the tire using a dedicated rubber socket.

When such a sensor module 110 is mounted in a tire or on an inner surface of the tire, it will rotate together with the tire. The contact between the tire and the ground results in a deformation of the tire. This deformation results in a change of the acceleration signal. Hence, a perturbation will be present in the data from the sensor. This perturbation is induced by the contact patch nearby the sensor. Acquiring the sensor data during this contact patch period is also referred to as contact patch acquisition. When attached to the tire, such sensor module is, therefore, capable of measuring signals revealing physical phenomena linked to the dynamics of the tire and its properties and to the interaction of the tire with the road surface.

Figure 2:
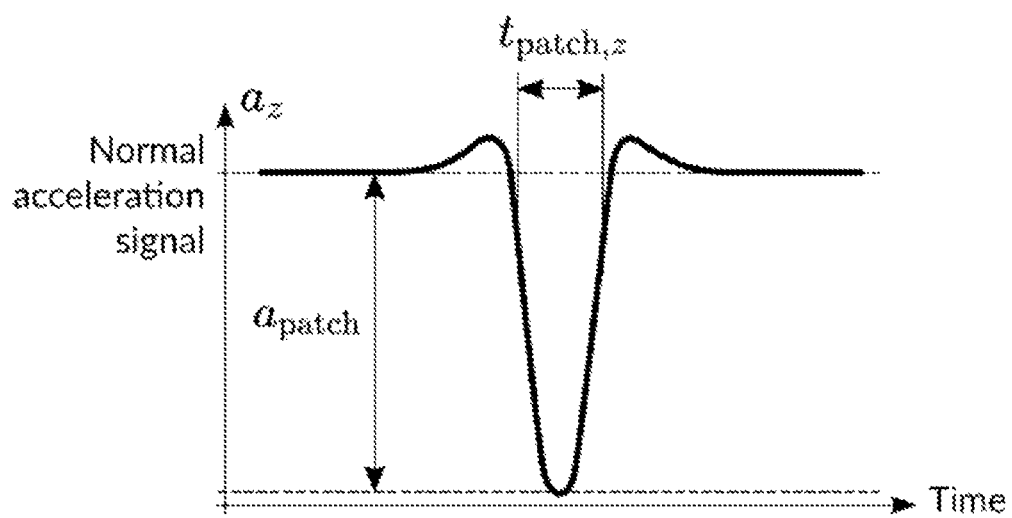
FIG. 2 shows a typical signal shape for normal accelerations as measured by a tire-mounted sensor at the contact patch instant.
Figure 3:
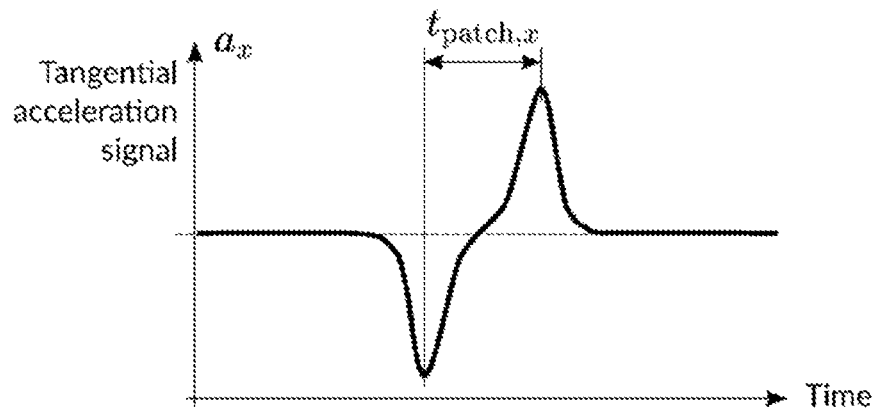
FIG. 3 shows a typical signal shape for tangential accelerations as measured by a tire-mounted sensor at the contact patch instant.

FIG. 1 shows a schematic drawing of a tire 310. The portion 320 of the tire which is in contact with the road can be referred to as "contact patch". Another commonly used term for the contact patch measurement is the tire "footprint". A sensor module 110 is mounted inside the tire, and the contact patch 320 is formed when the tire 310 hits the road surface. FIG. 2 and FIG. 3 show typical signal shapes for normal and tangential accelerations as measured by a tire-mounted sensor at the contact patch instant. In embodiments of the present invention the first direction may for example be the normal direction. In alternative embodiments the first direction may be the tangential direction. In some embodiments of the present invention the first direction may be the normal direction and the second direction may be the tangential direction or vice versa.

Out of the measured acceleration signals, several pieces of information (also referred to as features in the present invention) can be extracted by using different signal processing operations.

Some embodiments of the present invention may comprise only one acceleration sensor. In that case only the first acceleration signal is generated and the at least two features are determined from the first acceleration signal.

In some embodiments of the present invention two acceleration signals may be generated. In that case a feature of the first acceleration signal may be determined and a feature of the second acceleration signal may be determined. Alternatively, both features may be determined from the same acceleration signal.

In either case at least two features of the one or more acceleration signals are determined. These features are referred to as the first and second feature.

In embodiments of the present invention the consistency of the first feature and the second feature is verified by assessing if these features or a combination thereof meet an expected operation characteristic. The operation characteristic may define an expected relationship between the features and upper and lower limits between the relationship may vary in a correctly operating sensor when it is mounted in a tire.

In embodiments of the present invention the predefined operation characteristic may comprise an upper limit and/or a lower limit (also referred to as operation limits).

In embodiments of the present invention the first feature is used to obtain at least one operation limit of the second feature, from the expected operation characteristic, and a comparison result is obtained by comparing the second feature with the at least one operation limit in order to determine whether the features are consistent. In embodiments of the present invention, the correct operation of the sensor module can be determined from the comparison result. The system may be configured for outputting the comparison result.

In embodiments of the present invention an upper and a lower operation limit may be determined from the predefined operation characteristic, for the second feature, given a first feature. During correct operation the second feature should be between the upper and lower operation limit. If this is not the case the system can indicate incorrect operation of the sensor.

In embodiments of the present invention a single sensor is sufficient for determining correct operation of the sensor. The obtained features are in that case coming from that single sensor.

In embodiments of the present invention the predefined operation characteristic may be obtained by calibration of the sensor. Alternatively, in embodiments of the present invention, the predefined operation characteristic may for example be stored in on-board memory, or may be obtained through an interface.

It is an advantage of embodiments of the present invention that the integrity of contact patch measurements and associated features can be assessed.

In embodiments of the present invention the acquisition of the data may be performed using an analog to digital converter (ADC). This ADC converts an analog signal from the sensor into digitized data. The processing module may sample the data from the analog to digital converter and process the acquired data for determining characterizing features of the perturbations.

An example of such a perturbation is shown in FIG. 2. It shows the perturbation generated by an acceleration sensor which is adapted for measuring the radial acceleration (i.e., acceleration along the Z-axis in FIG. 2). The amplitude of the perturbation is shown in function of time. The perturbation has a falling edge from a first maximum to a minimum and a rising edge from the minimum to a second maximum. The patch duration is a measure for the duration of the perturbation. The patch duration ($t_{patch}$) may for example be defined as the duration between the first maximum and the second maximum. The threshold which is crossed by the amplitude of the perturbation may be used as characterizing feature of the pulse. The moment when the leading edge crosses the threshold, or when the trailing edge crosses the threshold may also be used as characterizing feature of the pulse. The patch duration ($t_{patch}$) may be defined as the elapsed time between the moment when the leading edge crosses a threshold and the moment when the trailing edge crosses the threshold. The acceleration signal, and/or characterizing features thereof, may be wirelessly transmitted. In embodiments of the present invention the wireless message may for example comprise a unique identifier of the sensor module and a value representative of the measured patch duration.

FIG. 3 shows the acceleration signal of a tangential acceleration sensor in function of time. The acquisition of the signal may be done using an ADC. The patch duration is, in this example, measured between two opposed peaks of the tangential acceleration signal.

In embodiments of the present invention a cross-correlation (e.g., a signed-step cross-correlation, explained below) algorithm may for example be used to extract the contact patch width ($t_{patch}$) and patch amplitude ($a_{patch}$) out of the measured normal acceleration signal.

The equations below describe how the signed-step cross-correlation values S(n) may be calculated from the measured data samples a and the signed reference sequence y with parameter N, in accordance with an exemplary embodiment of the present invention.

$$S(n) = \frac{1}{2N} \sum_{m=0}^{2N-1} a(n+m-2N+1)y(m)$$

In this equation N is a natural number bigger than 0, and y is the step function. In embodiments of the present invention N may be equal to 1 or larger. In some embodiments of the present invention the minimum value of N is 2.

The step function y may for example be described with the following formula.
sign($\Sigma_{m=0}^{N-1} y(m)$), is opposite to $$\text{sign}\left(\sum_{m=N}^{2N} y(m)\right)$$

In some embodiments of the present invention the sign of y(m) for 0≤m<N is opposite to the sign of y(m) for N≤m<2N for those y(m) wherein y(m) is different from zero.

sign($y(m)$) for 0≤m<N is opposite to sign($y(m)$), −1 for N≤m<2N

In some embodiments of the present invention y=0 for one or more samples in the signed reference sequence y(m). The signed reference sequence y(m) may for example be different from zero for 0≤m<N−k1 and for N+k2≤m<2N and equal to zero for N−k1<m<N+k2 with k1 and k2 natural numbers different from zero (they may for example be equal).

In some embodiments of the present invention the absolute value of the samples of y(m) which are different from zero may be constant or may be varying (giving a different weight to the different data samples). In some embodiments of the present invention $\Sigma_{m=0}^{2N} y(m)=0$. In this example the step function is a finite signed-step sequence signal.

Figure 4:
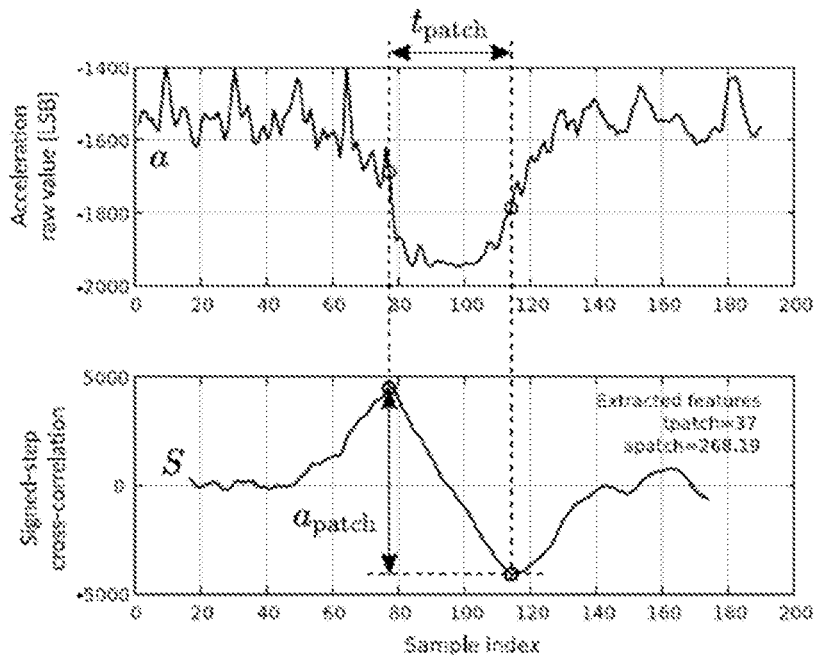
FIG. 4 shows an example of a signal obtained cross-correlating an acceleration signal in accordance with embodiments of the present invention.

An example of the use of a signed-step cross-correlation used for extracting the contact patch width ($t_{patch}$) and patch amplitude ($a_{patch}$) out of the measured normal acceleration signal is illustrated in FIG. 4. This example shows the computed features out of real measured normal acceleration values. It also visually defines how the patch width ($t_{patch}$) and patch depth ($a_{patch}$) features are calculated using a signed-step cross correlation (SSCC) algorithm (with N=16). The tire used for this example was a 225/45R17 tire. The speed was 30 km/h. A drum setup was used.

Figure 5:
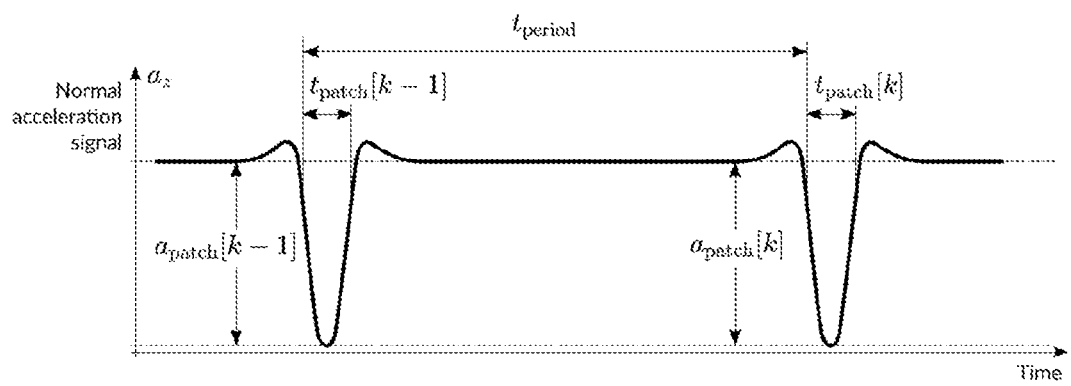
FIG. 5 shows an acceleration signal with consecutive patch events.

If such features are extracted for at least two consecutive contact patch events, added pieces of information can be further extracted, such as the time between two patch events, indirectly measuring the time period of the wheel revolution ($t_{period}$), as illustrated in FIG. 5. This figure shows measured normal acceleration signals for two consecutive contact patches. In that case the measurement period is slightly longer than a full tire revolution. Note that this figure only illustrates the principle and is not necessarily at scale.

Figure 6:
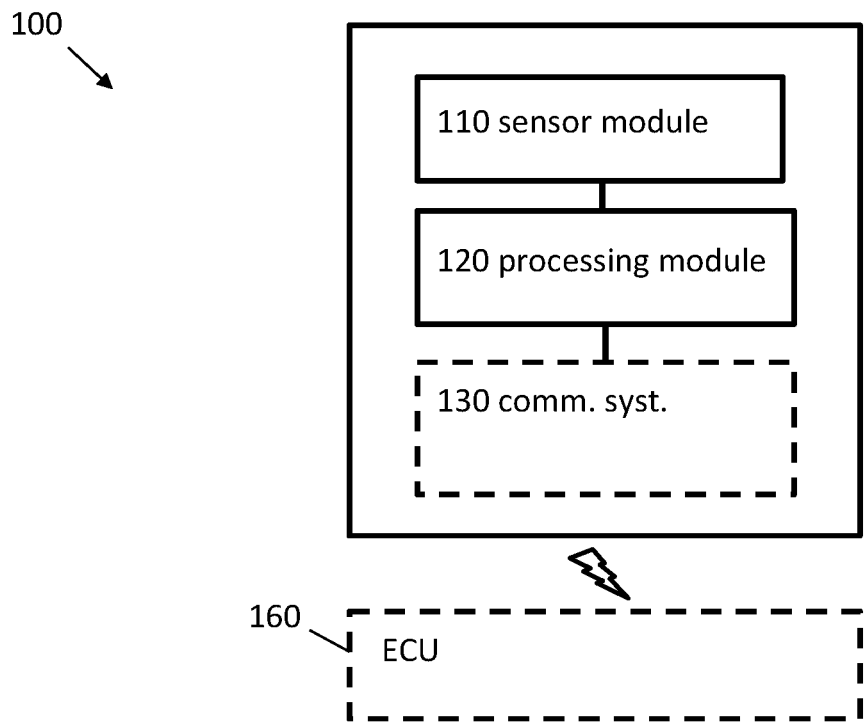
FIG. 6 shows a block diagram of an exemplary system in accordance with embodiments of the present invention.

FIG. 6 shows a block diagram of an exemplary system in accordance with embodiments of the present invention. The system comprises the sensor module 110, and the processing module 120. The processing module may be implemented as a single processor or as multiple processors (i.e., the functionality may be implemented over multiple processors). The features may for example be obtained by a processor/microcontroller mounted in the tire, and the further verification of the features may be done on a processor/microcontroller outside the tire.

In some embodiments of the present invention, the comparison/verification operation of the features is achieved in the processing module 120 in the tire, and the processing module 120 transmits an error signal to an electronic control unit (ECU) 160 outside the tire. This error signal indicates the integrity information about the measured features.

In some embodiments of the present invention some functionality of the processing module may be implemented in an external processing module. This may be the ECU 160.

The sensor system 100 may comprise a communication system 130 for wirelessly transmitting features of the acceleration signals and/or the comparison result to the ECU 160.

Figure 7:
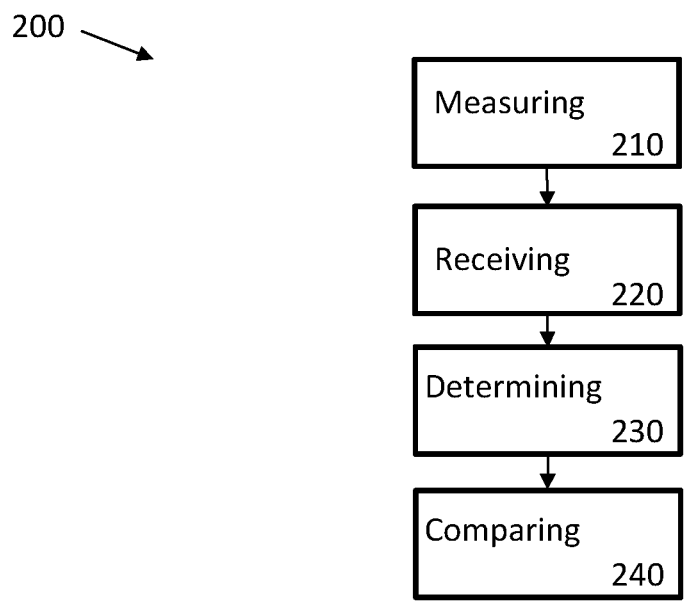
FIG. 7 shows a flow chart of an exemplary method in accordance with embodiments of the present invention.

In a second aspect embodiments of the present invention relate to a method 200 for determining correct operation of an acceleration sensor when mounted in a tire of a wheel of on an inner surface of a tire of the wheel. An exemplary flow chart of such a method is illustrated in FIG. 7. The method comprises:

measuring 210 a first acceleration in a first direction resulting in a first acceleration signal and/or measuring a second acceleration in a second direction, different from the first direction, resulting in a second acceleration signal;

receiving 220 the first acceleration signal and/or the second acceleration signal, determining 230 at least two features of the first acceleration signal and/or determining at least one feature of the first acceleration signal and at least one feature of the second acceleration signal, wherein the features are characterizing a perturbation in the acceleration signal caused when a part of the tire, where the sensor is mounted, hits the ground and forms a contact patch, wherein one of the features is a first feature and another feature is a second feature;

verifying 240 the consistency of the first feature and the second feature by assessing if these features or a combination thereof meet at least one predefined operation characteristic.

In embodiments of the present invention a result indicative for the correct operation of the acceleration sensor can be obtained using this verification.

In embodiments of the present invention the processing module 120 is configured for determining the at least two features from subsequent contact patches. These at least two features may for example be obtained from the first acceleration signal only. It is an advantage of embodiments of the present invention that only the first acceleration sensor is sufficient for determining the correct operation of the sensor. In some embodiments of the present invention the sensor may be configured for obtaining only one (the first) acceleration signal.

In embodiments of the present invention the features may be obtained from 2 different acceleration signals (e.g., radial and tangential).

In embodiments of the present invention the first feature may have a different type than a type of the second feature. The consistency of features with different types may be determined by comparing the second feature with operation limit(s) which are dependent on the first feature. These limit(s) may be obtained by calibration of a sensor which is operating correctly. These limit(s) may be part of the predetermined operation characteristic. In embodiments of the present invention these features with different types may be obtained from only one acceleration signal (e.g., radial or tangential) or they may be obtained from two acceleration signals (e.g., a first feature may be the duration derived from the radial acceleration and a second feature may be the amplitude derived from the tangential acceleration).

The first feature may for example be a duration of a perturbation caused by a contact patch, and the second feature may for example be an amplitude of a perturbation caused by a contact patch.

In embodiments of the present invention both features may be obtained from the same perturbation. By calibration the operation characteristic may be determined. This operation characteristic may for example comprise operation limits within which a feature should remain. If the feature exceeds one of these operating limits the correct operation of the sensor may be questioned. The operation limits for the amplitude may for example be determined in function of the duration, or vice versa, the operation limits of the duration may be determined in function the amplitude.

In embodiments of the present invention the processing module may be configured for determining the at least two features from subsequent patches and the first feature may be of a different type than the second feature. In some embodiments the first feature may even be obtained from the first acceleration signal and the second feature from the second acceleration signal.

In embodiments of the present invention the processing module is configured for combining a plurality of comparison results in an overall integrity assessment. In that case more than two features may be determined. The consistency of the features may for example be verified per pair of features.

In an exemplary embodiment of the present invention the integrity of the contact patch measurements may be checked by applying one or a combination of the following evaluations:

Check of the consistency of different but correlated features extracted out of acceleration measurements on the same direction;

Comparison of features extracted from consecutive contact patch measurements, relying upon the fact that it is not expected that the values differ too significantly from one tire revolution to the next. The comparison is done based on expected normal usage (driving at constant speed, braking, accelerating) and guaranteed maximum time in-between consecutive measurements (to ensure correlation between measurements). It was surprisingly found by the inventors, that even when breaking or accelerating (which is considered as normal usage), the values of consecutive patch measurements are still correlated and therefore can be used to check the integrity of the contact patch measurements.

Comparison of similar or significantly correlated features extracted out of at least two acceleration sensors oriented along a different axis.

Figure 8:
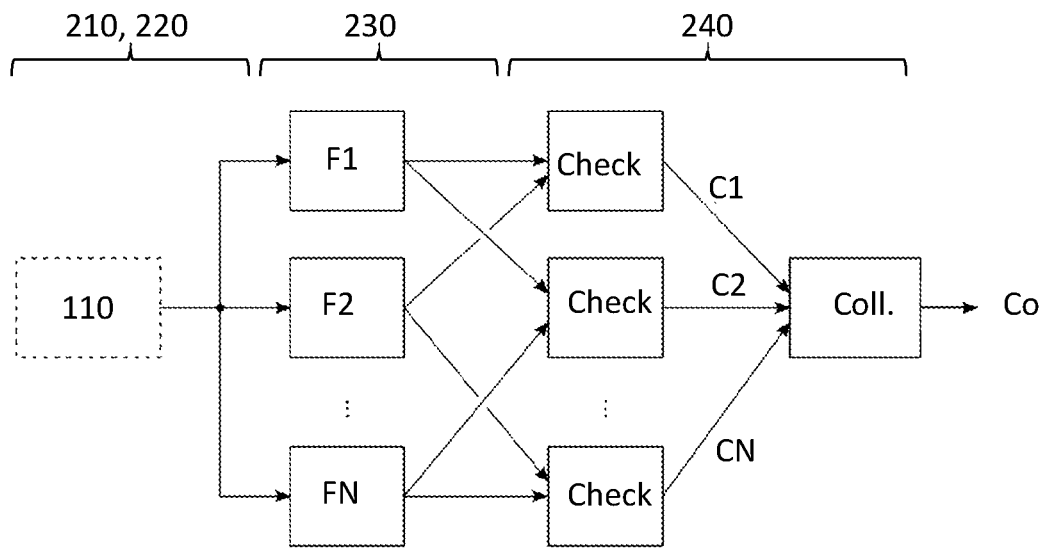
FIG. 8 shows a flow chart of an exemplary method in accordance with embodiments of the present invention wherein multiple features are obtained from a single acceleration signal.

FIG. 8 shows a flow chart of an exemplary method in accordance with embodiments of the present invention. An acceleration signal is provided by the sensor module 110. Next, features F1, F2, . . . FN are calculated 230 from the acceleration signal. In this case one signal from the acceleration sensor is used to calculate several features. Next, a feature consistency check 240 is done. The feature consistency check, in this example, is done on different pairs of features. Chosen pairs of extracted features with significant correlation are used as inputs for consistency checks. In embodiments of the present invention one feature may be used to determine at least one operation limit of the other feature and the other feature is compared with the at least one operation limit to obtain the consistency result. Thus, consistency results C1, C2, . . . CN are obtained. These are combined in the last step to obtain an overall consistency result. Thus, an overall integrity assessment is obtained. For example, only if all consistency checks (or if the most significant consistency checks) are assessed as correct, the overall integrity assessment may be considered positive.

In this figure, features from consecutive patch measurements may be compared. The consistency check verifying the difference between values obtained from consecutive contact patches. In this example each time 2 features are compared. The invention is, however, not limited thereto. Also, more than 2 features can be compared (e.g., 3 features, or 4 features, or even more features).

Figure 9:
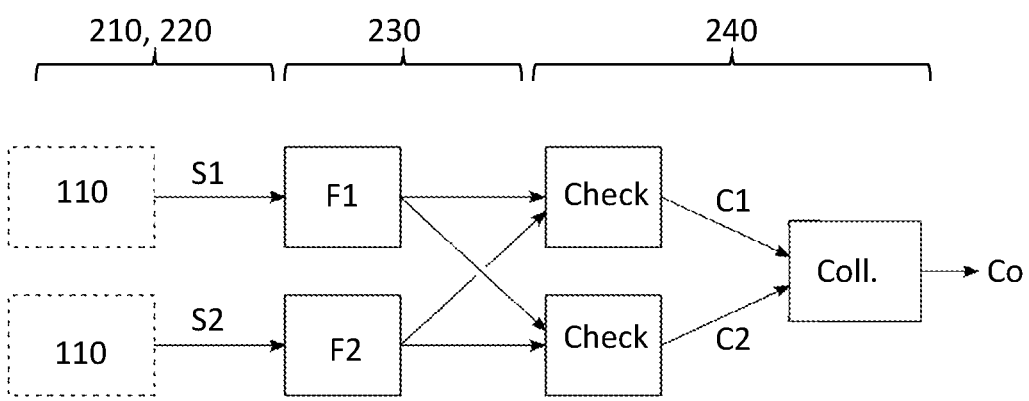
FIG. 9 shows a flow chart of an exemplary method in accordance with embodiments of the present invention wherein features are obtained from two acceleration signals.

In FIG. 9, two acceleration signals S1, S2 are generated. For example, a first acceleration signal in a first direction and a second acceleration in a second direction different from the first direction. A first feature is obtained from the first acceleration signal and a second feature is obtained from the second acceleration signal. These features may have the same type (e.g., duration from both acceleration signals, or amplitude from both acceleration signals), or they may have a different type (e.g., duration from one acceleration signal and amplitude from the other acceleration signal). The features extracted from different acceleration sensors are checked against each other. For example, the contact patch width as extracted from the normal acceleration could be compared with the contact patch width as extracted from the tangential acceleration. The obtained consistency results are collected in order to obtain an overall consistency result. In embodiments of the present invention, the two acceleration signals S1 and S2 are obtained from an accelerometer. The accelerometer may be a MEMS accelerometer, for example. In exemplary embodiments of the invention, the MEMS accelerometer comprises two distinct proof masses (or test masses) integrated in a same substrate, each measuring an acceleration component (e.g., radial and tangential).

It is an advantage of embodiments of the present invention that the consistency results are combined. Thus, the integrity assessment, based on the obtained features, is strengthened compared to an embodiment wherein the consistency of only two features is checked.

As an illustration for the proposed method, FIGS. 10 to 15 show obtained results using real values from a sensor module mounted 110 in a vehicle and subjected to a full road trip, including different speeds up to 100 km/h and several direction changes.

Figure 10:
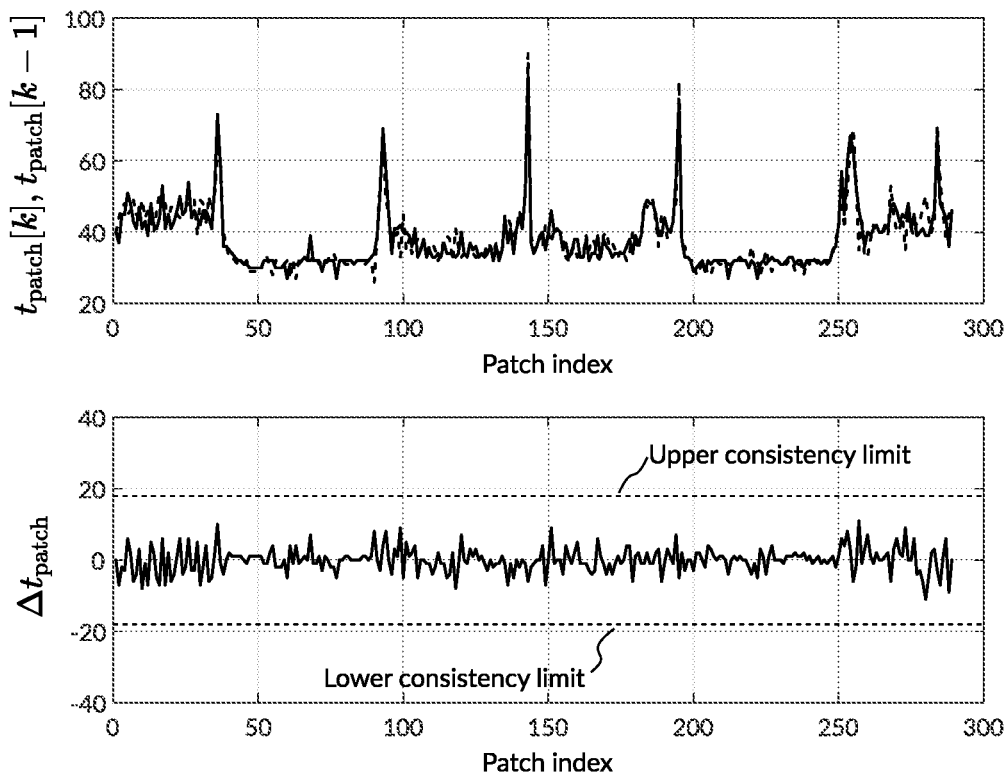
FIG. 10 shows the extracted contact patch width feature for several pairs of consecutive contact patches, and the differences between these consecutive features and limits of these differences in accordance with embodiments of the present invention.

FIG. 10 shows the extracted contact patch width ($t_{patch}$) feature for several pairs of consecutive contact patches. It also shows the difference between these consecutive features and how this difference can be compared against one upper and one lower threshold limit to assess the consistency of the measurement. A consistency check can be performed on the difference value based on upper and lower acceptable limits based on the observation that the $t_{patch}$ feature value should not vary unexpectedly between two consecutive measurements (within one wheel cycle). It was observed that the difference value does not significantly deviate even in the presence of strong breaking and acceleration events, i.e., fast change of speed and $t_{patch}$, and therefore provides a reliable information for the consistency check. In this example the predefined operation characteristic may be an upper and a lower consistency limit for the difference between the patch periods of two consecutive measurements (within one wheel cycle). This difference may be calculated as follows:

$$\Delta t_{patch} = t_{patch}[k] - t_{patch}[k-1]$$

with k the patch index. In other embodiments, a difference is not needed, and upper/lower limits may be set for $t_{patch}[k-1]$ based on $t_{patch}[k]$, or vice versa.

Figure 11:
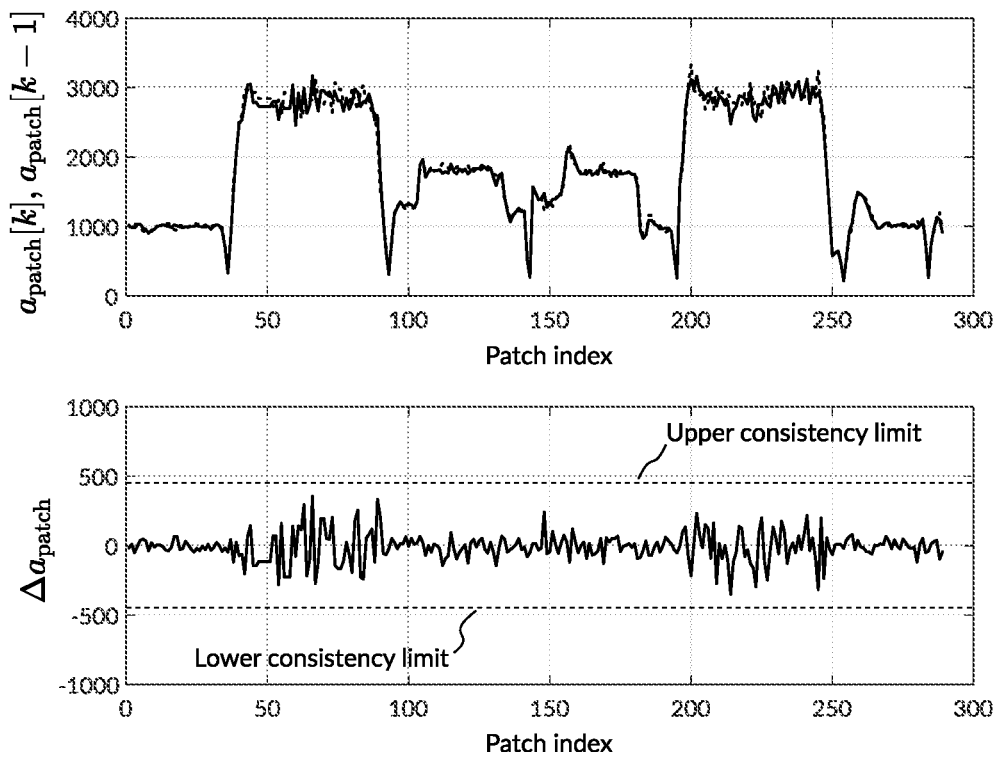
FIG. 11 shows the same graphs for the extracted contact patch amplitude.

FIG. 11 shows the same graphs for the extracted contact patch amplitude ($a_{patch}$) for several pairs of consecutive contact patches. This figure shows the acquired $a_{patch}$ feature over a full road trip with different speeds and direction changes. It shows $a_{patch}$ values for directly consecutive acquisitions. The difference between consecutive values is also computed and checked against upper and lower consistency limits. In this example the predefined operation characteristic may be an upper and a lower consistency limit for the difference between the patch amplitudes of two consecutive measurements (within one wheel cycle). This difference may be calculated as follows:

$$\Delta t_{patch} = t_{patch}[k] - t_{patch}[k-1]$$

with k the patch index.

Figure 12:
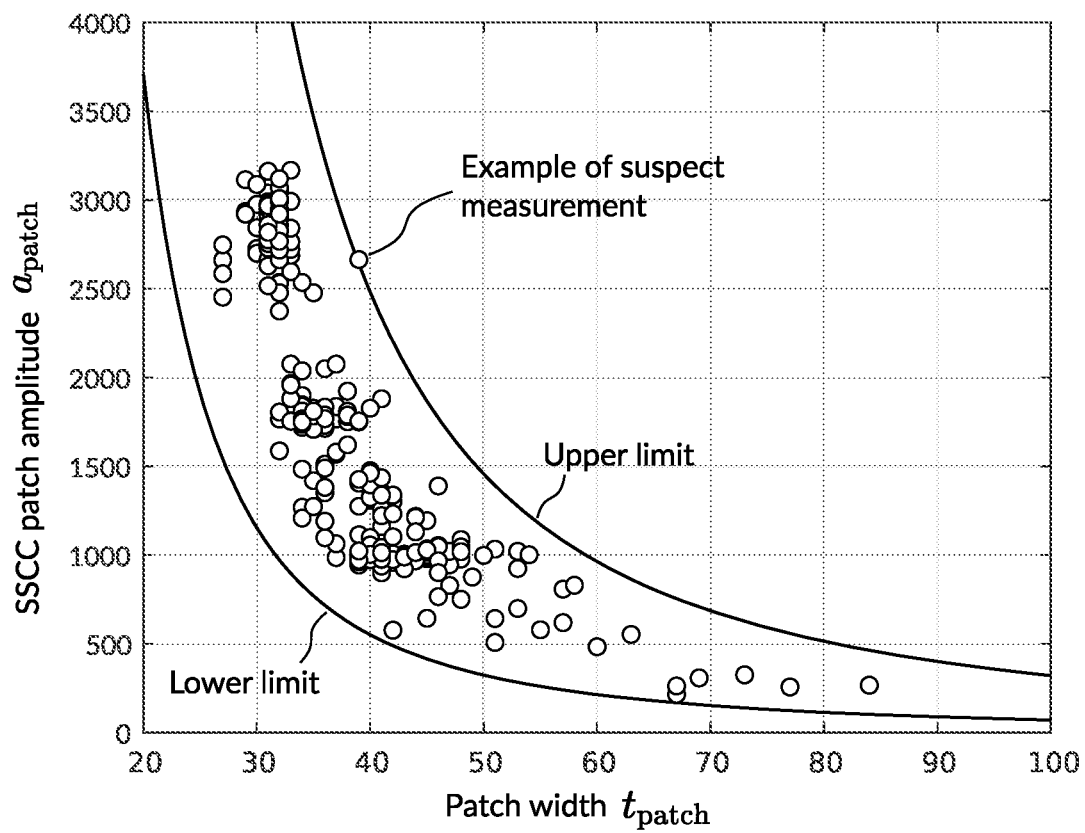
FIG. 12 illustrates how the contact patch width and amplitude features can be checked against each other as dependent values using consistency limits in accordance with embodiments of the present invention.

In embodiments of the present invention the contact patch width and amplitude features can be checked against each other as dependent values using consistency limits such as illustrated by FIG. 12. This figure shows the relationship between $a_{patch}$ and $t_{patch}$ features acquired over a full trip with different speeds and direction changes. A consistency check can be made between these two features based on dependent upper and lower limits. For this example, the predefined operation characteristic may comprise an upper and a lower limit of the patch amplitude $a_{patch}$ for each patch width $t_{patch}$. The features may be extracted using a signed step cross correlation algorithm, as illustrated in FIG. 12, however, this is not necessary, and the features may be extracted from the raw data as well as explained above.

Figure 13:
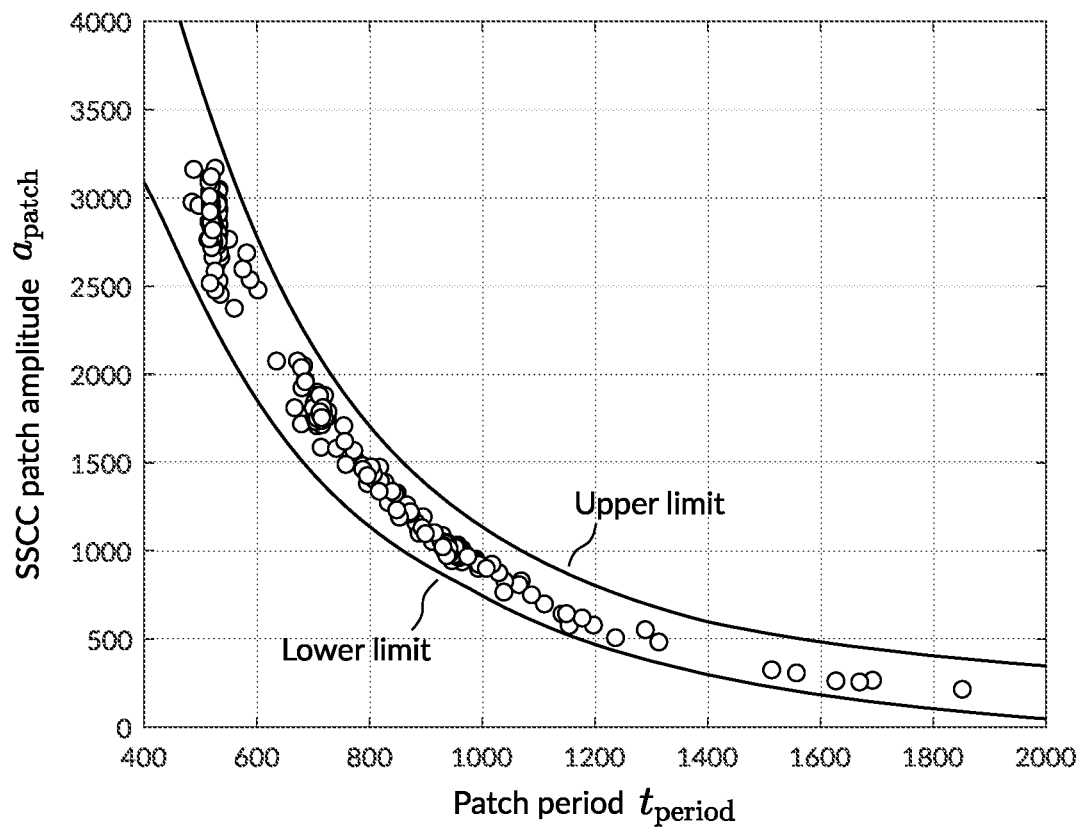
FIG. 13 illustrates how the contact patch amplitude and periodicity features can be checked against each other as dependent values using consistency limits in accordance with embodiments of the present invention.

The consistency of other features may also be verified. FIG. 13, for example, shows the relationship between the contact patch amplitude $a_{patch}$ and periodicity $t_{period}$ features acquired with the same conditions. The features are acquired over a full road trip with different speeds and direction changes. A consistency check can be made between these two features based on dependent upper and lower limits. For this example, the predefined operation characteristic may comprise an upper and a lower limit of the patch amplitude $a_{patch}$ for the different patch periods $t_{period}$.

Figure 14:
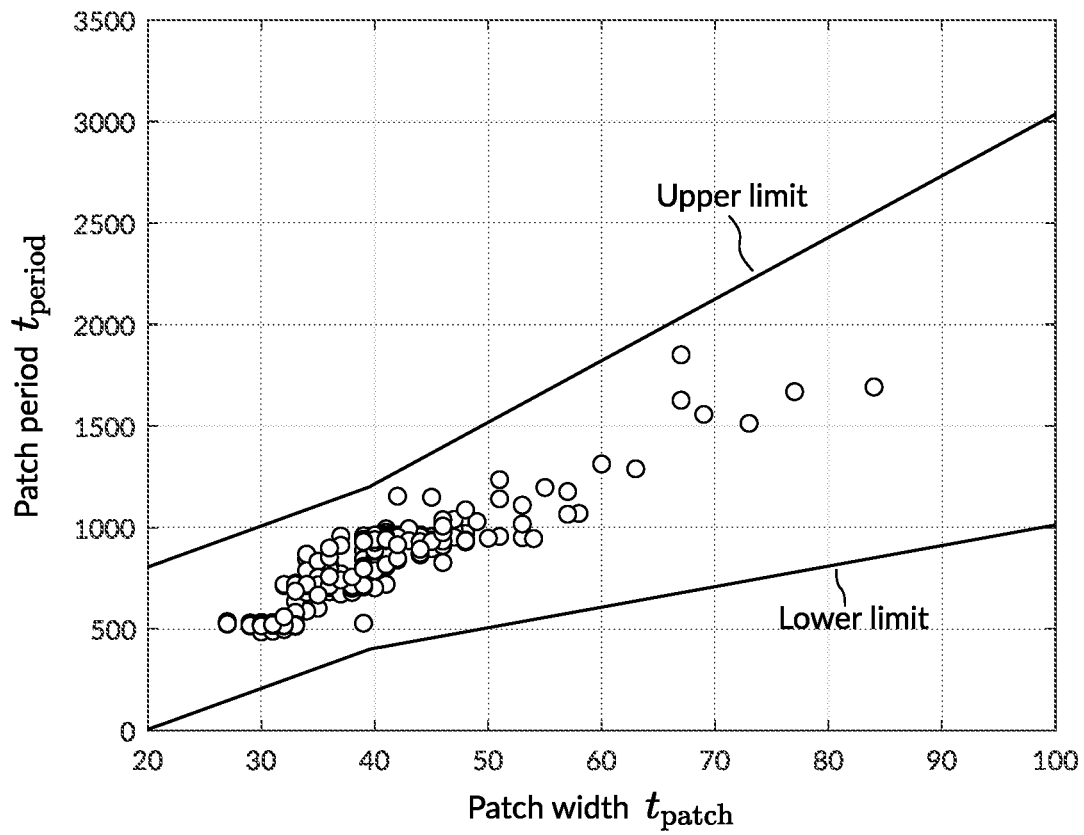
FIG. 14 illustrates how the periodicity and the contact patch width can be checked against each other as dependent values using consistency limits in accordance with embodiments of the present invention.
Figure 15:
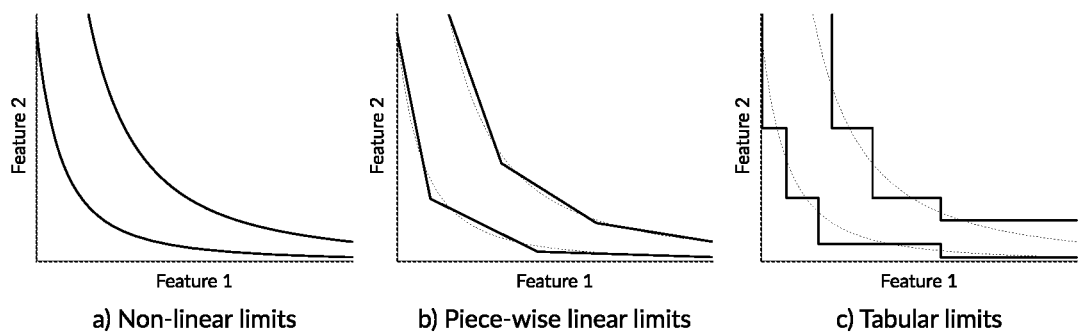
FIG. 15 illustrates possible implementations for different limits implementations for two features with a nonlinear relationship are illustrated in FIG. 11.

FIG. 14 shows the relationship between the periodicity $t_{period}$ and the contact patch width $t_{patch}$, also acquired with the same conditions. A consistency check can be made between these two features based on dependent upper and lower limits. For this example, the predefined operation characteristic may comprise an upper and a lower limit of the patch periods $t_{period}$ for the different patch widths $t_{width}$.

In embodiments of the present invention the upper and lower consistency limits may be defined in the value plane of the two compared features as simple constant thresholds. These consistency limits are for example applicable when checking a difference between consecutive feature values.

In embodiments of the present invention the at least two features may have anon-linear relationship. In these embodiments the corresponding predefined operation characteristic has a non-linear relationship in accordance with the non-linear relationship of the features.

In embodiments of the present invention the non-linear operation characteristic may be expressed in a continuous form. In other embodiments they may be expressed as piece-wise linear limits. In other embodiments of the present invention, they may be expressed as tabular limits.

In embodiments of the present invention the at least two features may have a linear relationship and the corresponding predefined operation characteristic has a linear relationship in accordance with the linear relationship of the features.

Simple linear functions are typically used when checking features that are directly proportionally correlated to each other. They may be stored in the predefined operation characteristic as non-linear functions (see the left graph in FIG. 15). Such non-linear functions may be defined for the examples in FIG. 12 and FIG. 13.

Piece-wise linear or linear functions may be used for defining upper and lower limits for features which have a piece-wise linear or linear relationship such as the features in FIG. 14. Piece-wise linear functions may also be used to approximate a non-linear limit (see middle graph of FIG. 15).

In embodiments of the present invention look-up tables (binning) may be used to approximate an upper or lower limit. The tradeoff for the choice of implementation for the consistency check method and limits has to be made between implementation complexity, implementation cost, accuracy and safety.

As discussed before, a method according to embodiments of the present invention may comprise obtaining the predefined operation characteristic limits by measuring the at least two features during correct operation of the sensor. Thereby the wheel may be rotated at different speeds in order to cover the expected operating range of the sensor. Thus, the operation characteristic can be obtained through calibration. In a method according to embodiments of the present invention at least two features may be determined from subsequent contact patches. In a method according to embodiments of the present invention the at least two features may be determined such that the first feature has a different type than a type of the second feature.

The invention claimed is:

1. A system configured for assessing the integrity of a sensor module mounted in a tire of a wheel or on an inner surface of the tire of the wheel, the system comprising:
   a sensor module configured for measuring a first acceleration in a first direction resulting in a first acceleration signal and/or for measuring a second acceleration in a second direction, different from the first direction, resulting in a second acceleration signal, a processing module configured for:
   receiving the first acceleration signal and/or the second acceleration signal,
   determining at least two features of the first acceleration signal and/or determining at least one feature of the first acceleration signal and at least one feature of the second acceleration signal, wherein the features are characterizing a perturbation in the acceleration signal caused when a part of the tire, where the sensor module is mounted, hits the ground and forms a contact patch, wherein one of the features is a first feature and another feature is a second feature, and wherein the first feature has a different type than a type of the second feature,
   verifying whether the first feature and the second feature are consistent with each other by assessing if these features or a combination thereof meet a predefined operation characteristic.

2. The system according to claim 1, wherein the predefined operation characteristic comprises an upper limit and/or a lower limit.

3. The system according to claim 2, wherein the upper limit and/or lower limit are limits for the second feature and are defined in function of the first feature.

4. The system according to claim 1, wherein the processing module is configured for determining the at least two features from subsequent contact patches.

5. The system according to claim 1, wherein the first feature is a duration of a perturbation caused by a contact patch, and wherein the second feature is an amplitude of a perturbation caused by a contact patch.

6. The system according to claim 1, wherein the first direction is a normal direction or wherein the first direction is a tangential direction.

7. The system according to claim 1, wherein the sensor module is configured for measuring the first acceleration in the first direction and the second acceleration in the second direction and wherein the first direction is a normal direction and the second direction is a tangential direction.

8. The system according to claim 7, wherein the processing module is configured for determining the at least two features from subsequent patches and wherein the first feature is of a different type than the second feature.

9. The system according to claim 1, wherein the processing module is configured for obtaining the predefined operation characteristic by calibration.

10. The system according to claim 1, wherein the processing module is configured for combining a plurality of comparison results in an overall integrity assessment.

11. The system according to claim 1, wherein the at least two features have a non-linear relationship and wherein the corresponding predefined operation characteristic has a non-linear relationship in accordance with the non-linear relationship of the features.

12. The system according to claim 1, wherein the at least two features have a linear relationship and wherein the corresponding predefined operation characteristic has a linear relationship in accordance with the linear relationship of the features.

13. A method for determining correct operation of an acceleration sensor when mounted in a tire of a wheel of on an inner surface of a tire of the wheel, the method comprising:
measuring a first acceleration in a first direction resulting in a first acceleration signal and/or measuring a second acceleration in a second direction, different from the first direction, resulting in a second acceleration signal,
receiving the first acceleration signal and/or the second acceleration signal,
determining at least two features of the first acceleration signal and/or determining at least one feature of the first acceleration signal and at least one feature of the second acceleration signal, wherein the features are characterizing a perturbation in the acceleration signal caused when a part of the tire, where the sensor is mounted, hits the ground and forms a contact patch, wherein one of the features is a first feature and another feature is a second feature, and wherein the first feature has a different type than a type of the second feature,
verifying whether the first feature and the second feature are consistent with each other by assessing if these features or a combination thereof meet at least one predefined operation characteristic.

14. The method according to claim 13, the method moreover comprising obtaining the predefined operation characteristic by measuring the at least two features during correct operation of the sensor.

* * * * *